US012627134B2

(12) United States Patent
Gietzold et al.

(10) Patent No.: US 12,627,134 B2
(45) Date of Patent: May 12, 2026

(54) AIRCRAFT SOLID STATE POWER CONTROLLER AND METHOD OF OPERATING AN AIRCRAFT SOLID STATE POWER CONTROLLER

(71) Applicant: HS Elektronik Systeme GmbH, Noerdlingen (DE)

(72) Inventors: Thomas Gietzold, Unterwilflingen (DE); Gerd Kluger, Ederheim (DE); Peter Brantl, Fremdingen (DE); Stefan Schreitmueller, Auhausen (DE)

(73) Assignee: HS Elektronik Systeme GmbH, Nordlingen (DE)

( * ) Notice: Subject to any disclaimer, the term of this patent is extended or adjusted under 35 U.S.C. 154(b) by 9 days.

(21) Appl. No.: 18/381,099

(22) Filed: Oct. 17, 2023

(65) Prior Publication Data

US 2024/0128736 A1 Apr. 18, 2024

(30) Foreign Application Priority Data

Oct. 18, 2022 (EP) ..................................... 22202131

(51) Int. Cl.
*H02H 3/28* (2006.01)
*H02J 1/00* (2006.01)
*H02J 105/30* (2026.01)

(52) U.S. Cl.
CPC ................. *H02H 3/28* (2013.01); *H02J 1/00* (2013.01); *H02J 2310/44* (2020.01)

(58) Field of Classification Search
CPC ... H02H 3/28; H02H 3/044; H02J 1/00; H02J 2310/44; G01R 31/3277; H03K 17/18
(Continued)

(56) References Cited

U.S. PATENT DOCUMENTS 5,594,285 A * 1/1997 Wisbey .................. B64D 41/00
361/624
7,656,634 B2 * 2/2010 Robertson .......... H03K 17/0822
361/111
(Continued)

FOREIGN PATENT DOCUMENTS

EP 2843836 A1 3/2015
EP 3176903 A2 * 6/2017 .............. H02J 1/102
(Continued)

OTHER PUBLICATIONS

European Search Report dated Mar. 15, 2023 in connection with European Patent Application No. 22202131.3, 8 pages.
(Continued)

*Primary Examiner* — Dharti H Patel

(57) ABSTRACT

An aircraft solid state power controller comprises a feed node to be electrically connected to a primary electric power supply; a load node to be electrically connected to at least one electric load; and at least one electric switching device, in particular a solid state switching device, which is arranged between the feed node and the load node. The at least one electric switching device is switchable between an on-state, in which the at least one electric switching device provides a low-resistive electric connection between the feed node and the load node; and an off-state, in which the at least one electric switching device electrically isolates the load node from the feed node. The aircraft solid state power controller further comprises a secondary electric power supply, which is independent from the primary electric power supply, and which is configured for applying a test voltage between the feed node and the load node of the aircraft solid state power controller in order to allow determining the switching state of the at least one electric switching device by detecting a
(Continued)

voltage drop between the feed node and the load node of the aircraft solid state power controller.

20 Claims, 5 Drawing Sheets

(58) Field of Classification Search
USPC ........................................................... 361/62
See application file for complete search history.

(56) References Cited

U.S. PATENT DOCUMENTS

| | | | | |
|---|---|---|---|---|
| 8,547,675 | B2 * | 10/2013 | Maier | G05F 1/569 |
| | | | | 361/93.1 |
| 8,861,162 | B2 * | 10/2014 | Fuller | H01H 9/548 |
| | | | | 361/42 |
| 8,891,218 | B2 | 11/2014 | Holley et al. | |
| 10,691,189 | B2 * | 6/2020 | Su | H02H 3/247 |
| 10,739,404 | B2 | 8/2020 | Wandres et al. | |
| 10,892,618 | B1 * | 1/2021 | Cooper | H02J 3/007 |
| 11,095,113 | B2 * | 8/2021 | Dickey | H02H 3/08 |
| 11,128,118 | B2 | 9/2021 | Rauwolf et al. | |
| 11,391,805 | B2 | 7/2022 | Dickey | |
| 11,664,180 | B2 * | 5/2023 | Payne | H01H 33/59 |
| | | | | 361/140 |
| 11,722,130 | B1 * | 8/2023 | Tran | H03K 17/165 |
| | | | | 361/93.1 |
| 2008/0019070 | A1 * | 1/2008 | Kilroy | H02H 9/04 |
| | | | | 361/100 |
| 2010/0254046 | A1 * | 10/2010 | Liu | H02H 3/087 |
| | | | | 361/13 |
| 2010/0295525 | A1 * | 11/2010 | Frey | H02M 1/32 |
| | | | | 323/285 |
| 2013/0329329 | A1 * | 12/2013 | Liu | H02H 9/02 |
| | | | | 307/9.1 |
| 2016/0204777 | A1 * | 7/2016 | Greither | H03K 17/122 |
| | | | | 327/434 |
| 2018/0183228 | A1 | 6/2018 | Huber | |
| 2018/0323608 | A1 * | 11/2018 | Valdivia Guerrero | |
| | | | | H02H 9/002 |
| 2022/0153428 | A1 * | 5/2022 | Elliott | H02J 4/00 |

FOREIGN PATENT DOCUMENTS

| | | | | |
|---|---|---|---|---|
| EP | 3595111 A1 * | 1/2020 | | H02H 7/262 |
| FR | 3085153 B1 | 8/2020 | | |

OTHER PUBLICATIONS

Yu et al., "Drain-Source Voltage Clamp Circuit for Online Accurate ON-State Resistance Measurement of SiC MOSFETs in DC Solid-State Power Controller," IEEE Journal of Emerging and Selected Topics in Power Electronics, vol. 8, Issue 1, Mar. 2020, 12 pages.

Office Action dated Apr. 8, 2026 in connection with European Patent Application No. 22 202 131.3, 8 pages.

Kar et al., "Design, Performance Evaluation, Fabrication and Testing of a SiC MOSFET Gate Driver," IEEE Spices, 2017 6 pages.

* cited by examiner

Fig. 4

AIRCRAFT SOLID STATE POWER CONTROLLER AND METHOD OF OPERATING AN AIRCRAFT SOLID STATE POWER CONTROLLER

CROSS-REFERENCE TO RELATED APPLICATIONS

This application claims priority to and the benefit of European Patent Application No. 22202131.3, filed Oct. 18, 2022, the entire content of which is incorporated herein by reference.

TECHNICAL FIELD

The invention is related to aircraft solid state power controller ("SSPC") for controlling the supply of electric power from an aircraft electric power supply to at least one electric load within an aircraft. The invention is further related to a method of operating such an aircraft solid state power controller.

BACKGROUND

Modern aircraft usually comprise at least one aircraft solid state power controller ("SSPC") for controlling the supply of electric power from an aircraft electric power supply to at least one electric load. The at least one SSPC in particular includes at least one electric switching device, in particular at least one solid state switching device, which is configured for selectively switching the electric power supplied to the at least one electric load. For securing a secure and reliable operation of the at least one SSPC, the functionality of the at least one electric switching device is to be regularly checked.

It therefore would be beneficial to provide an improved SSPC including at least one electric switching device, wherein the SSPC allows for an easy, fast and reliable checking of the functionality of the at least one electric switching device.

SUMMARY

According to an exemplary embodiment of the invention, an aircraft solid state power controller ("SSPC") for controlling the supply of electric power from an aircraft electric power supply to at least one electric load within an aircraft comprises a feed node, which is to be electrically connected to a primary electric power supply of the aircraft; a load node, which is to be electrically connected to the at least one electric load; and at least one electric switching device, in particular at least one solid state switching device, which is arranged between the feed node and the load node for controlling the supply of electric power from the feed node to the load node.

The at least one electric switching device is in particular switchable between an on-state, in which the at least one electric switching device provides a low-resistive electric connection between the feed node and the load node; and a high-resistive off-state, in which the at least one electric switching device electrically isolates the at least one load node from the feed node.

The SSPC further comprises a secondary electric power supply, which is independent from the primary electric power supply. The secondary electric power supply is configured for applying a test voltage between the feed node and the load node of the SSPC in order to allow for determining the switching state of the at least one electric switching device by detecting a voltage drop between the feed node and the load node. As the secondary power supply is independent from the primary power supply, the switching state of the at least one electric switching device can be detected independent of whether the primary electric power supply is connected to the feed node.

Exemplary embodiments of the invention also include an aircraft, such as an airplane or a helicopter, comprising at least one electric power supply and at least one SSPC according to an exemplary embodiment of the invention.

Exemplary embodiments of the invention further include a method of operating an SSPC, wherein the SSPC comprises a feed node, which is to be electrically connected to a primary electric power supply; aloud node, which is to be electrically connected to at least one electric load; and at least one electric switching device, in particular at least one solid state switching device, which is arranged between the feed node and the load node for switching the supply of electric power from the feed node to the load node; wherein the method comprises: selectively switching the at least one electric switching device between an on-state, in which the at least one electric switching device provides a low-resistive electric connection between the feed node and the load node so that the primary power supply is electrically connected with the electric load; and a high-resistive off-state, in which the at least one electric switching device electrically isolates the load node from the feed node; applying a test voltage between the feed node and the load node of the SSPC; wherein the test voltage is provided by a secondary electric power supply, which is independent from the primary electric power supply; and determining the switching state of the at least one electric switching device by detecting a voltage drop between the feed node and the load node of the SSPC.

With an SSPC according to an exemplary embodiment of the invention, the switching state of the at least one electric switching device may be detected independently of a feed voltage supplied by the primary electric power supply. In addition, in an SSPC according to an exemplary embodiment of the invention, the detection of the switching state of the at least one electric switching device is not deteriorated by the electric load. As a result, the switching state of the at least one electric switching device may be monitored very reliably, and the operational safety of the SSPC may be enhanced. A signal indicative of the correct operation, or the switching state, of the electric switching device may be provided independent of other operations of the SSPC, particularly independent of the primary electric power supply.

The at least one electric switching device may be a solid state switching device, in particular a transistor such as a bipolar transistor, an insulated-gate bipolar transistor (IGBT), or a field-effect transistor (FET), in particular a metal-oxide-semiconductor field-effect transistor (MOS-FET). Such electric switching devices provide very reliable and efficient electric switching devices.

Particular embodiments may further include one, or a plurality, of the following optional features. These optional features may be applied separately, or in combination with each other, unless specified otherwise.

In an embodiment, the secondary electric power supply is galvanically isolated from the primary electric power supply in order to provide an electric separation between the primary electric power supply and the secondary electric power supply. Such an electric separation allows preventing any undesirable interactions between the primary electric power supply and the secondary electric power supply.

In an embodiment, the SSPC comprises further electric power supplies, which are provided for supplying electric power to further electric components of the SSPC, and the secondary electric power supply is galvanically isolated from, these additional power supplies as well.

In an embodiment, the SSPC comprises an integrated circuit including an isolated DC power supply, which is employed as the secondary power supply. The integrated circuit may, for example, include a controller for controlling the operation of the SSPC. Providing the secondary power supply as part of an integrated circuit of the SSPC is a very efficient way of providing the secondary power supply.

In an embodiment, the secondary power supply may be provided as a separate secondary power supply. This allows for a clear separation between the SSPC and/or electric components of the SSPC and the secondary power supply.

In an embodiment, the secondary power supply may be provided as a shared secondary power supply for applying the test voltage between the feed node and the load node and for providing also other voltages, for example a voltage for operating a controller of the SSPC and/or a control voltage, which is to be applied to a control terminal of the at least one electric switching device. Such an embodiment allows using the secondary power supply very efficiently.

In an embodiment, the integrated circuit including the power supply is a DC/DC power chip, in particular an ADUM 5241 chip or an ADUM 5242 chip.

In an embodiment, the at least one electric switching device comprises a control terminal for receiving a control voltage for controlling/switching the at least one electric switching device at least between a low-resistive on-state and a high-resistive off-state. In such an embodiment, the SSPC may further comprise an electric switching device controller, which is configured applying the control voltage to the control terminal of the at least one electric switching device for selectively switching the at least one electric switching device at least between the on-state and the off-state.

In an embodiment, the secondary power supply is configured for providing electric power for supplying the control voltage to the control terminal of the at least one electric switching device. This allows for a very efficient use of the secondary power supply.

In an embodiment, the electric switching device comprises a first terminal connected to the feed node and a second terminal connected to the load node, and the secondary power supply is referenced to the second terminal of the at least one electric switching device, or to a reference point between the second terminal and the load node of the solid state power controller, in order to apply a defined electric test voltage between the feed node and the load node of the at least one electric switching device.

In an embodiment, the SSPC further comprises a test voltage sensor, which is configured for detecting a voltage drop which allows determining the switching state of the at least one electric switching device. The voltage sensor may in particular be configured for detecting the above mentioned voltage drop between the feed node and the load node of the solid state switching element when applying the test voltage $V_{iso}$. In an embodiment, such voltage drop between the feed node and the load node of the solid state switching element when applying the test voltage $V_{iso}$ may be detected by connecting a test voltage measurement resistor in series with the solid state switching element and parallel to the load node and detecting a voltage drop across the test voltage resistor element when applying the test voltage $V_{iso}$.

In an embodiment, the test voltage sensor is configured to deliver a signal indicating whether the at least one electric switching device is in its on-state or in its off-state. The test voltage sensor may in particular be configured for delivering a binary signal.

In an embodiment, the SSPC comprises a test voltage sensor, which is configured for detecting a voltage drop that allows determining the switching state of the at least one electric switching device, and a comparator, which is configured for comparing the voltage signal detected by the test voltage sensor with a reference voltage, and for providing a binary signal indicating the switching state of the at least one electric switching device based on the comparison. The status of the binary signal may depend on whether the voltage drop, as it is detected by the test voltage sensor, exceeds the predefined reference voltage or not.

In an embodiment, the comparator comprises a first input for receiving a voltage signal delivered by the test voltage sensor and indicating the voltage drop, and a second input for receiving the reference voltage. This allows the comparator to compare the voltage drop measured by the test voltage sensor with a predefined reference voltage, which is supplied to the comparator.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein:

FIG. 4 shows a circuit diagram of an SSPC according to another exemplary embodiment of the invention.

DETAILED DESCRIPTION

In the following, exemplary embodiments of the invention are described with reference to the enclosed figures.

Figure 1:
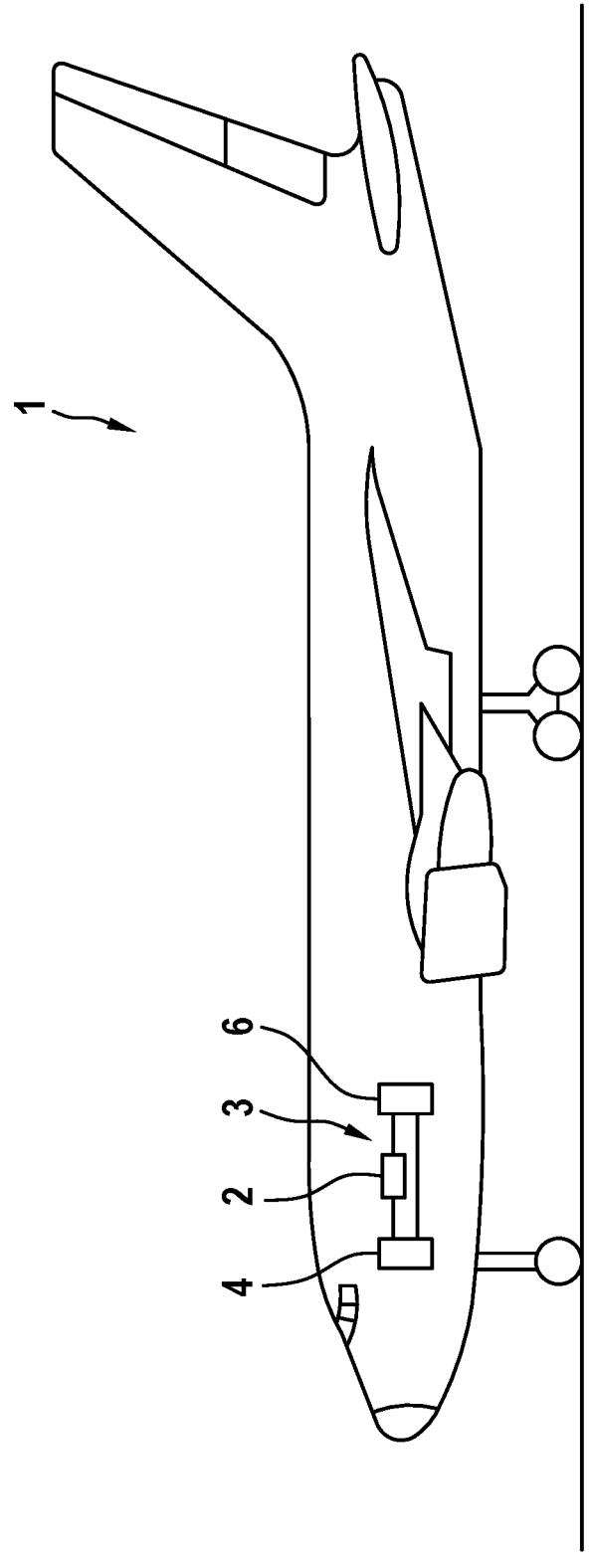
FIG. 1 shows an aircraft comprising an aircraft electric power supply system including an SSPC according to an exemplary embodiment of the invention.

FIG. 1 shows an aircraft 1, in particular an airplane, which is equipped with an aircraft electric power supply system 3. The aircraft electric power supply system 3 includes an aircraft electric power supply 4, an electric load 6, and an aircraft solid state power controller ("SSPC") 2 according to an exemplary embodiment of the invention, which is configured for controlling the supply of electric power from the aircraft electric power supply 4 to the electric load 6.

Although the aircraft electric power supply system 3, as depicted in FIG. 1, includes only a single aircraft electric power supply 4, a single electric load 6, and a single SSPC 2, respectively, it is to be understood that this is a simplified representations for reasons of clarifying the teachings of the present disclosure. Embodiments of an aircraft electric power supply system 3 may comprise more the one of each of said components, respectively. Particularly, embodiments of an aircraft electric power supply system 3 may comprise a plurality of SSPC's 2 connected to different loads 6, respectively.

Figure 2:
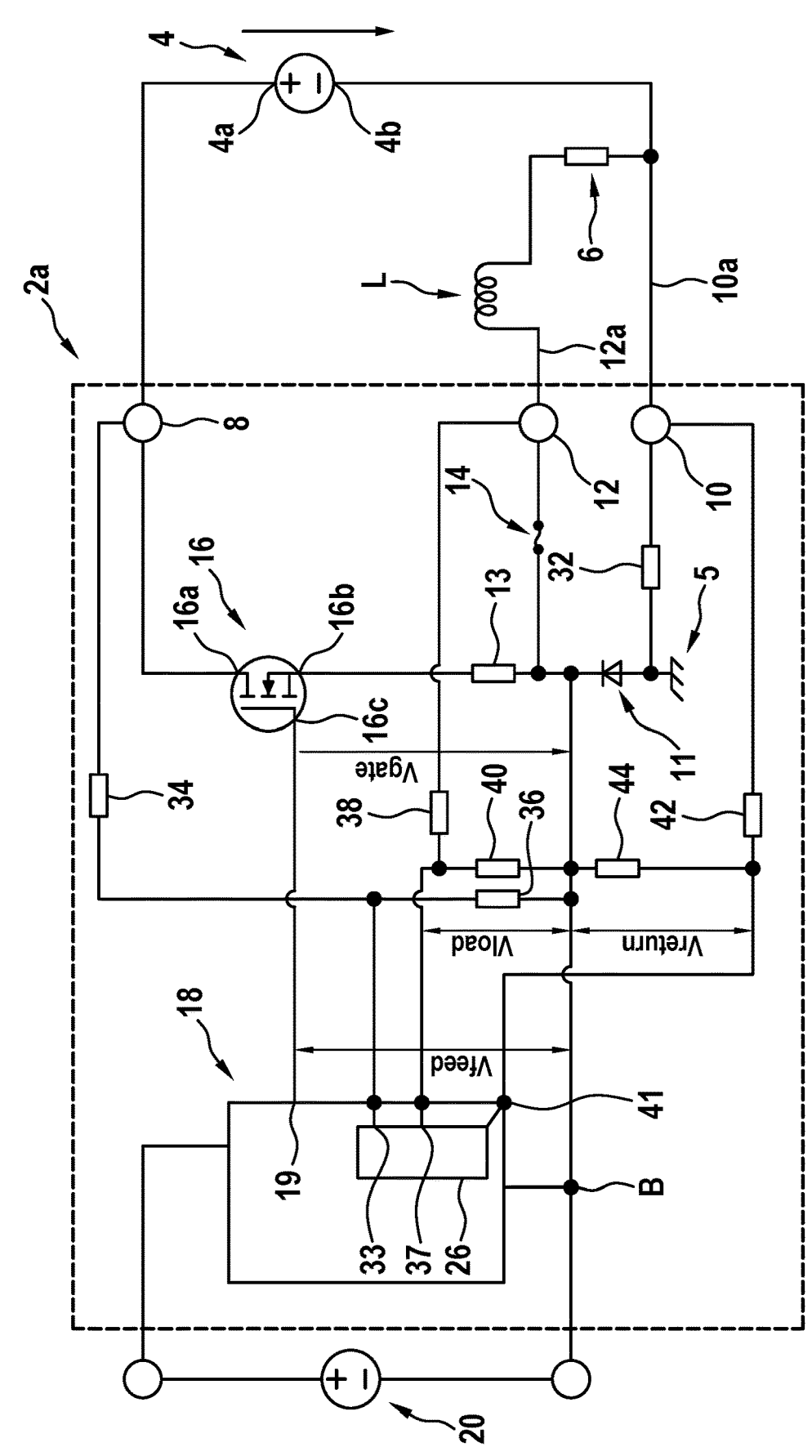
FIG. 2 shows a circuit diagram of an SSPC, which allows controlling the supply of electric power to a load in an aircraft.
Figure 3:
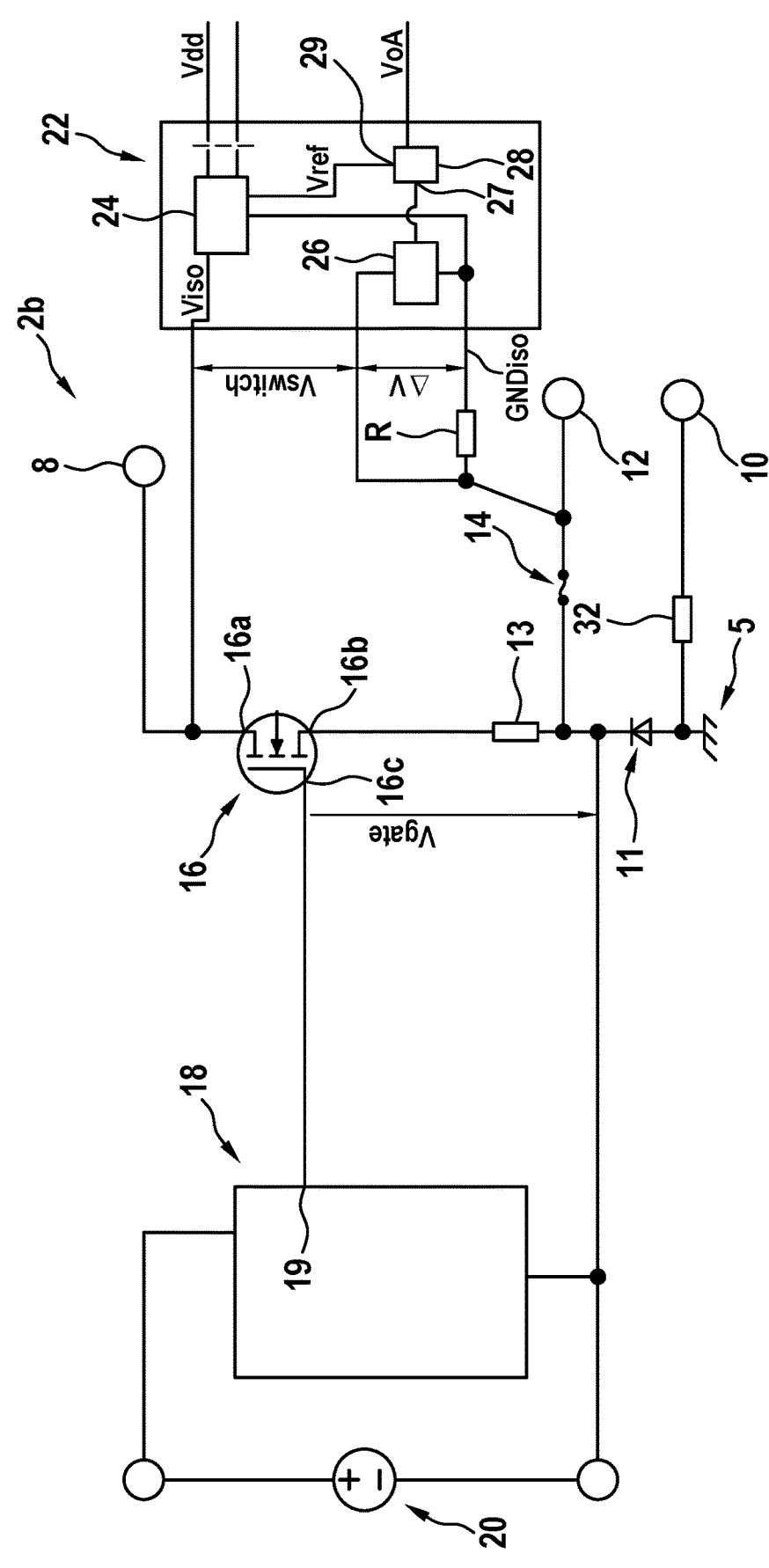
FIG. 3 shows a circuit diagram of an SSPC according to an exemplary embodiment of the invention.
Figure 4:
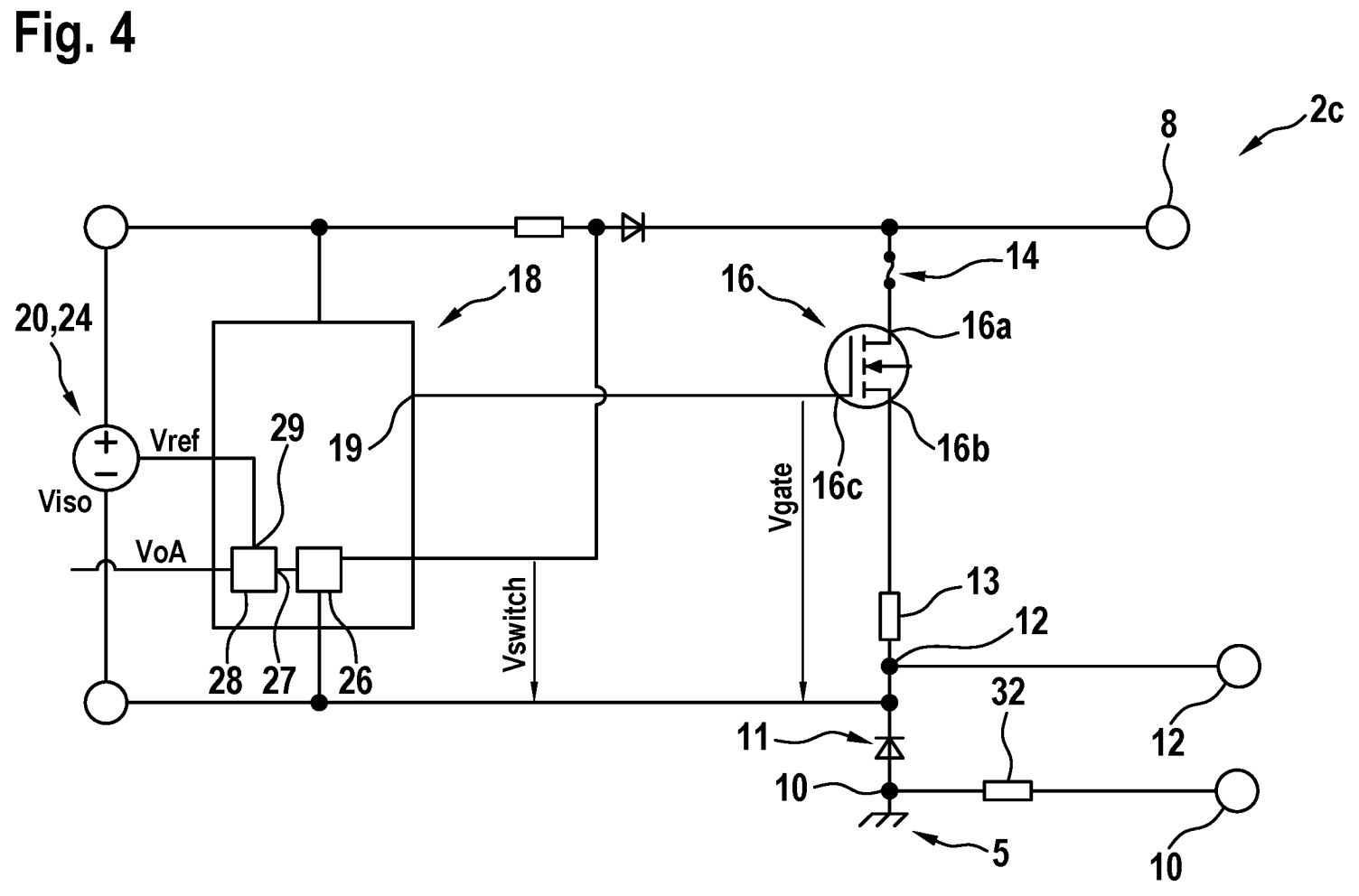

An aircraft electric power supply system 3 may in particular include a plurality of SSPCs 2, wherein each SSPC 2 includes numerous SSPC channels of the types, which are depicted in FIGS. 2 to 4 and described in the following.

FIG. 2 shows a circuit diagram of an SSPC 2a, which allows controlling the supply of electric power to a load 6 in an aircraft 1.

The SSPC 2a comprises an input node ("feed node") 8, which is electrically connected to a first output node 4a of the aircraft electric power supply ("primary power supply") 4, and a return node 10, which is electrically connected to a second output node 4b of the aircraft electric power supply 4. In the embodiment shown, the return node 10 is also electrically connected to the electric ground 5 of the aircraft 1. A line impedance is indicated by 32. In alternative embodiments, the feed node 8 may be connected to a first electric supply voltage (e.g. positive supply voltage) and the return node 10 may be electrically connected to a second electric supply voltage (e.g. negative supply voltage).

The SSPC 2a further comprises an output node ("load node") 12. The electric load 6 is connected between the load node 12 and the return node 10/second output node 4b of the aircraft electric power supply 4 for being selectively supplied with electric power from the aircraft electric power supply 4 via the SSPC 2a.

In FIG. 2, an inductivity L represents an inductivity of the electric load 6 and/or an inductivity of the power supply lines 10a, 12a, which connect the electric load 6 with the SSPC 2a.

For dissipating inductive electric voltages, which may be induced by the inductivity L when the supply of electric power to the electric load 6 is switched off, a free-wheeling diode 11 is connected between the return node 10 and the load node 12 of the SSPC 2a. A thermal fuse 14 is connected in between the feed node 8 and the load node 12.

The SSPC 2a comprises an electric switching device 16, in particular a solid state switching device 16, connected in between the feed node 8 and the load node 12. The electric switching device 16 comprises a first terminal 16a, a second terminal 16b, and a control terminal 16c. The first terminal 16a of the electric switching device 16 is electrically connected with the feed node 8 of the SSPC 2a. The second terminal 16b of the electric switching device 16 is electrically connected with the load node 12 of the SSPC 2a (e.g. via a shunt resistor 13 for measuring load current and thermal fuse 14, as shown in the embodiment of FIG. 2).

The electric switching device 16 may be a solid state switching device, in particular a transistor such as a bipolar transistor, an insulated-gate bipolar transistor (IGBT), or a field-effect transistor (FET), in particular a metal-oxide-semiconductor field-effect transistor (MOSFET).

The thermal fuse 14 is connected between the second terminal 16b of the electric switching device 16 and the load node 12 of the SSPC 2. A shunt resistor 13 is connected between the second terminal 16b of the electric switching device 16 and the load node 12. The shunt resistor 13 is configured for measuring a load current flowing through the load 6 when the electric switching device 16 is switched on. The resistance of the shunt resistor 13 is relatively low, in the range of 1 mΩ to 100 mΩ, in particular in the range of 1 mΩ to 10 mΩ, thus the voltage drop $V_{shunt}$ over the shunt resistor 13 is very small and generally negligible.

By applying an appropriate control voltage ("$V_{gate}$") to the control terminal 16c of the electric switching device 16, the electric switching device 16 is switchable between an on-state, in which the electric resistivity between first terminal 16a and the second terminal 16b is low, and an off-state, in which the electric resistivity between first terminal 16a and the second terminal 16b is high.

The SSPC 2a also comprises an electric switching device controller 18 with a control output node 19. The control output node 19 is electrically connected to the control node 16c of the electric switching device 16 for selectively supplying appropriate control voltages to the electric switching device 16. By supplying appropriate control voltages to the electric switching device 16, the electric switching device 16 may be switched between its low-resistive on-state and its high-resistive off-state for selectively activating and deactivating the electric load 6, which is electrically connected to the SSPC 2a.

The electric switching device controller 18 is supplied with electric power from a switching device controller power supply 20. The switching device controller power supply 20 is configured to be independent of the primary power supply 4. The switching device controller power supply 20 may in particular be galvanically separated from the primary power supply 4.

The switching device controller power supply 20 may be configured for providing a DC voltage, which may be in the range from 5 V to 30 V, in particular in the range of 10 V to 28 V, to the electric switching device controller 18.

For monitoring the correct operation of the electric switching device 16, the input voltage ("feed voltage $V_{feed}$") between the feed node 8 and the return node 10 of the SSPC 2a as well as the output voltage ("load voltage $V_{load}$") between the load node 12 and the return node 10 of the SSPC 2a may be detected by a voltage sensor 26 within the electric switching device controller 18, and the voltage drop $V_{switch}$ over the electric switching device 16 may be determined indirectly as the difference between the feed voltage $V_{feed}$ and load voltage $V_{load}$: $V_{switch} = V_{feed} - V_{load}$.

In a conventional configuration as shown in FIG. 2, both the load voltage $V_{load}$ and the feed voltage $V_{feed}$ are detected with respect to a common reference voltage B by respective voltage dividers 34/36 (for the load voltage $V_{load}$, see 33) and 38/40 (for the feed voltage $V_{feed}$, see 37). An additional voltage divider 42/44 is configured to detect a return voltage $V_{return}$ of the return node 10 (see 41) with respect to the reference voltage B. By subtracting the signal provided by the voltage divider 38/40 from the signal provided from the voltage divider 34/36 it is possible to calculate the voltage drop $V_{switch}$ over the electric switching device 16 (including switching device 16 and shunt resistor 13). This configuration requires a microcontroller and is dependent on supply of the feed voltage to between the feed node 8 and return node of the SSPC 2a.

When the electric switching device 16 is switched off, the off-resistance of the electric switching device 16 is very large, and therefore the voltage drop between the first and second terminals 16, 16b of the electric switching device 16 is approximately equal to the feed voltage $V_{feed}$ and the voltage $V_{load}$ at the electric load 6 is approximately equal to the voltage at the return node 10/negative pole 4b of the primary power supply 4. When the electric switching device 16 is switched on, the voltage drop $V_{switch}$ between the first and second terminals 16, 16b of the electric switching device 16 is determined by the on-resistance of the electric switching device and thus is close to zero (compared to the feed voltage $V_{feed}$). Hence, $V_{load} \approx V_{feed}$ in the on-switching state of the electric switching device 16.

Thus, the actual switching state of the electric switching device 16 may be determined indirectly by measuring the voltages $V_{load}$ and $V_{feed}$ with respect to reference voltage B and calculating a difference $V_{feed} - V_{load}$.

In order to be able to monitor the correct operation of the electric switching device 16 as it has been described before, a feed voltage $V_{feed}$ needs to be supplied to the feed node 8 and return node 10 by the primary power supply 4 to the SSPC 2a. In consequence, the described method of determining the actual switching state of the electric switching device 16 cannot be applied when the feed voltage $V_{feed}$ is not available, for example since the SSPC 2a is not connected to the primary power supply 4, or the primary power supply 4 is not operating. Moreover, measuring $V_{load}$ and $V_{feed}$ as described above requires a relatively complicated setup of voltage measurements and voltage dividers, in order to determine the switching condition of the electric switching device 16 indirectly as the difference between $V_{feed}$ and $V_{load}$.

Further, the validity of the test result, which may be achieved by the described method, may be deteriorated by back-feeding voltage from the electric load 6. Due to the large variety of possible electric loads 6 having different electric properties, which may be connected to the SSPC 2a, it is rather difficult to set up a reliable detection algorithm, which allows for reliably differentiating between a correct function and a malfunction of the electric switching device 16.

It is therefore desirable to provide an improved SSPC 2, which overcomes the above mentioned problems.

FIG. 3 shows a circuit diagram of an SSPC 2b according to an exemplary embodiment of the invention. The SSPC 2b of FIG. 3 largely has the same configuration as the SSPC 2a of FIG. 2. Therefore, only components different from the SSPC 2a of FIG. 2 are depicted in FIG. 3 and described in further detail hereinafter. A number of components have been omitted in FIG. 3 for sake of clarity. Reference is made to FIG. 2 and its description with respect to such components that have been omitted in FIG. 3.

The components of the SSPC 2b that correspond to respective components of the SSPC 2a depicted in FIG. 2 are denoted with the same references and are not discussed in detail again. Reference is made to the corresponding description of FIG. 2.

For enhancing the clarity of the illustration, the primary power supply 4 and the electric load 6 are not depicted in FIG. 3. The primary power supply 4 and the electric load 6 may be connected to the input node 8, to the output node 12, and to the return node 10, as it is depicted in FIG. 2.

The SSPC 2b depicted in FIG. 3 comprises a solid switching device test circuit 22, which is electrically connected to the first terminal 16a and to the second terminal 16b of the electric switching device 16 for monitoring the switching state of the electric switching device 16.

The solid switching device test circuit 22 is configured for monitoring the switching state of the electric switching device 16 directly. The solid switching device test circuit 22 is in particular configured for monitoring the switching state of the electric switching device 16 independently of the feed voltage $V_{feed}$, which is supplied by the primary power supply (which is not shown in FIG. 3).

The solid switching device test circuit 22 comprises a secondary electric power supply 24, which is independent of the primary power supply 4. The secondary electric power supply 24 is configured for providing a test voltage $V_{iso}$, in particular a DC voltage $V_{iso}$ in the range of 5 V to 30 V, in particular in the range of 10 V to 28 V. The secondary electric power supply 24 may be galvanically isolated from its power supply, particularly from the primary electric power supply 4. This is schematically indicated by a dashed line in FIG. 3.

The test voltage $V_{iso}$ supplied by the secondary electric power supply 24 is applied to the first and second terminals 16a, 16b of the electric switching device 16. The ground voltage or reference voltage $GND_{iso}$ of the secondary electric power supply 24 is in particular electrically connected to the load node 12 of the SSPC 2 (and thus basically corresponds to the voltage at the second terminal 16b of the electric switching device 16, as the resistance of the shunt resistor 13 is very small). In consequence, the test voltage $V_{iso}$ supplied by the secondary electric power supply 24 is referenced to the load node 12 of the SSPC 2 or to the second terminal 16b of the electric switching device 16.

The solid switching device test circuit 22 further comprises a voltage sensor 26, which is configured for detecting the voltage drop $\Delta V$ over a test resistor R, which is connected between the of the load node 12 of the SSPC 2b and the ground voltage or reference voltage $GND_{iso}$ of the secondary electric power supply 24.

The test resistor R may have a resistivity in the range of between $100\Omega$ and 680 k$\Omega$. The resistivity of the test resistor R may in particular be set high in comparison to the resistivity of the load 6 in order to avoid adding a considerable additional load to the electric switching device 16.

The voltage sensor 26 may be integrated with the secondary electric power supply 24, or it may be provided separately from the secondary electric power supply 24.

When the electric switching device 16 is switched on, i.e. when the electric switching device 16 is in a low resistive state (referred to as the on-resistance of the electric switching device 16) compared to the resistance of the test resistor R, the voltage drop $V_{switch}$ over the electric switching device 16 (including switching device 16 and shunt resistor 13) is lower than 1 V, depending on the type of the electric switching device 16. The voltage drop $V_{switch}$ over the electric switching device 16 may in particular be in the range of 0.3 V to 0.7 V. In consequence, the voltage drop $\Delta V = V_{iso} - V_{switch}$ over the test resistor R, which is detected by the voltage sensor 26, is close or equal to the test voltage $V_{iso}$ that is applied by the secondary electric power supply 24 to the input node 16a of the electric switching device 16.

When the electric switching device 16 is switched off, i.e. when the electric switching device 16 is in a high resistive state (referred to as the off-resistance of the electric switching device 16) compared to the resistance of the test resistor R, the voltage drop $V_{switch}$ over the electric switching device 16 is close or equal to the test voltage $V_{iso}$. In consequence the voltage drop $\Delta V = V_{iso} - V_{switch}$ over the test resistor R is close or equal to zero.

The solid switching device test circuit 22 may be configured to provide a test signal VOA that is based on the voltage drop $\Delta V$ over the test resistor R and that is indicative of the switching state of the electric switching device 16.

The solid switching device test circuit 22 may in particular comprise a comparator 28, which is configured for comparing the detected voltage drop $\Delta V$ over the test resistor R with a predefined reference voltage $V_{ref}$ and for providing a binary test signal VOA indicating whether the detected voltage drop $\Delta V$ is higher of lower than the predefined reference voltage $V_{ref}$.

The comparator 28 may comprise a first input 27 for receiving a voltage signal delivered by the voltage sensor 26, and a second input 29 for receiving the predefined reference voltage $V_{ref}$. The predefined reference voltage $V_{ref}$ may, for example be provided by the secondary power supply 24, and thus may be equal to, or at least derived from, the voltage $V_{iso}$ of the secondary electric power supply 24. Alternatively, the reference voltage $V_{ref}$ may be generated within the comparator 28 by an appropriate reference voltage generation circuit.

With an SSPC 2b comprising a solid switching device test circuit 22, as it is depicted in FIG. 3, the switching state of the electric switching device 16 may be detected directly and independently of the feed voltage $V_{feed}$ supplied by the primary electric power supply 4. In consequence, there is no risk that the detection of the switching state of the electric switching device 16 is deteriorated by any loads currents flowing through the electric load 6. As the secondary electric power supply 22 is independent of the primary electric power supply, it is not required to use a complicated resistor network for providing suitable voltage dividers for measuring the voltages $V_{feed}$, $V_{load}$ and $V_{return}$ as shown in FIG. 2.

As a result, the switching state of the electric switching device 16 may be monitored conveniently and very reliably, and the operational safety of the SSPC 2b may be enhanced.

The circuit branch including the return node 10, resistor 32 and free-wheeling diode 11 is optional and not required for using the solid switching device test circuit 22 as described above. In an embodiment not using a separate free-wheeling diode 11, the feed voltage may be supplied via the feed node 8 and supplied to the load (see reference sign 6 in FIG. 2) via the load node 12, depending on the switching state of the electric switching device 16. The load 6 may be connected to ground or to the opposite pole of the feed voltage source. Inductive electric voltages, which may be induced by the inductivity L when the supply of electric power to the electric load 6 is switched off, may be dissipated through the body of the electric switching device 16 in such embodiments. This also applies for the embodiment shown in FIG. 4.

FIG. 4 shows a circuit diagram of an SSPC 2c according to another exemplary embodiment of the invention.

In FIG. 4, the components of the SSPC 2c that correspond to the respective components of the SSPCs 2a, 2b depicted in FIGS. 2 and 3 are denoted with the same references and are not discussed in detail again. Reference is made to the description of FIGS. 2 and 3 with respect to such components.

For enhancing the clarity of the illustration, the primary power supply 4 and the electric load 6 are not depicted in FIG. 4. The primary power supply 4 and the electric load 6 may be connected to the feed node 8, to the load node 12, and to the return node 10, as it is depicted in FIG. 2.

FIG. 4 shows an electric switching device controller 18 which is configured for providing a control signal (usually a control voltage) to the control terminal 16c of the electric switching device 16. The electric switching device 16 is configured to switch between its on-state and its off-state depending on the control signal applied to the control terminal 16c. The control signal is referenced to one the first or second terminals 16a, 16b (in the embodiment of FIG. 4 to the second terminal 16b=source in case of a MOSFET 16) of the electric switching device 16 and is provided by the control signal terminal 19 of the electric switching device controller 18.

In the embodiment depicted in FIG. 4, the switching device controller power supply 20, which is employed for supplying electric power to the electric switching device controller 18 is simultaneously employed as the secondary electric power supply 24 for supplying the test voltage $V_{iso}=V_{controller}$, which is applied to the feed node 8 and lode node 12 of the SSPC 2c. For example, the switching device controller power supply 20 may be connected to the feed node 8 of the SSPC 2c via a resistor and a diode, and may be connected to the load node 12 of the SSPC 2c, as shown in the embodiment of FIG. 4.

The switching device controller power supply 20, which is simultaneously employed as the secondary electric power supply 24, is independent of the primary power supply 4 of the aircraft 1, which provides the feed voltage $V_{feed}$ to the input node (fee node) 8. The switching device controller power supply 20/secondary electric power supply 24 may in particular be galvanically isolated from the primary electric power supply 4, and the test voltage $V_{iso}$, which is output by the switching device controller power supply 20/secondary electric power supply 24, may be referenced to the output node 12 of the SSPC 2c.

Depending on the type of the electric switching device/solid state electric switching device 16, a voltage drop $V_{switch}$ over the electric switching device 16 (including the shunt resistor 13) may be in the range of 0.3 V to 0.7 V when the electric switching device 16 is switched on (corresponding to the low on-resistance of the electric switching device 16), and the voltage drop $V_{switch}$ over the electric switching device 16 may be equal to $V_{iso}=V_{controller}$, when the electric switching device 16 is switched off (because of the high off-resistance of the electric switching device).

The voltage drop $V_{switch}$ over the electric switching device 16 may be detected by a voltage sensor 26, which may be implemented as part of the electric switching device controller 18, as it is depicted in FIG. 4. In an alternative embodiment, which is not explicitly shown in the figures, a separate voltage sensor 26 may be provided separately from the electric switching device controller 18.

The voltage sensor 26 may include or may be connected to a comparator 28 for providing a binary test signal VOA indicating whether the detected voltage drop $V_{switch}$ is above or below a predefined reference voltage $V_{ref}$ as it has been described before with reference to FIG. 3.

The embodiment depicted in FIG. 4 allows for reliably and conveniently detecting the actual switching state of the electric switching device 16 independently of the feed voltage $V_{feed}$, which is supplied by the primary power supply 4. It further allows detecting the actual switching state of the electric switching device 16 independently of any load currents flowing through electric loads 6 that are connected to the SSPC 2c.

Employing the controller power supply 20 as the secondary electric power supply 24 for supplying the test voltage $V_{iso}$ to the electric switching device 16, as it is depicted in FIG. 4, avoids the need of providing an additional power supply in addition to the controller power supply 20. In other words, when compared to the embodiment depicted in FIG. 3, the number of isolated power supplies 20, 24, which are independent of the primary power supply 4 of the aircraft 1, may be reduced from two to one.

In consequence, the complexity and the costs of an SSPC 2c as it is depicted in FIG. 4 may be reduced over an SSPC 2b, as it is depicted in FIG. 3.

Figure 5:
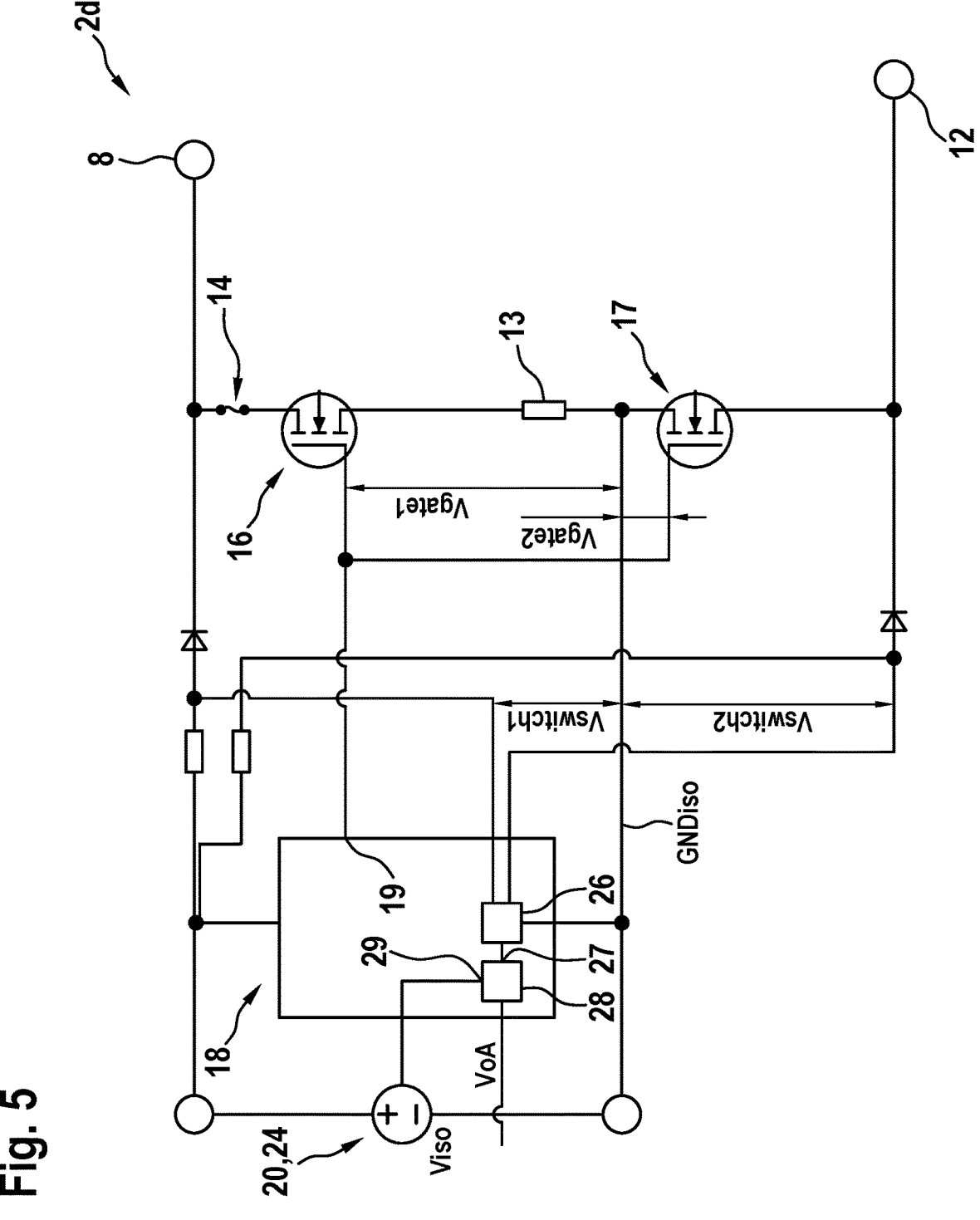
FIG. 5 shows a circuit diagram of an SSPC according to an exemplary embodiment of the invention, which is capable to switch AC voltages.

FIG. 5 shows a circuit diagram of an SSPC 2d according to yet another exemplary embodiment of the invention.

The components of the SSPC 2d that correspond to the respective components of the SSPC 2c depicted in FIG. 4 are denoted with the same references and are not discussed in detail again.

The SSPC 2d depicted in FIG. 5 is based on the SSPC 2d depicted in FIG. 4, but it comprises two electric switching devices 16, 17, in order to allow switching an AC feed voltage $V_{feed}$, which is to be supplied via feed node 8 of the SSPC 2d to a load connected to the load node 12.

The voltage sensor 26 provided within the electric switching device controller 18 may detect the two voltage drops $V_{switch1}$, $V_{switch2}$ over the first and second electric switching devices 16, 17 respectively, in order to determine the current switching state of the respective electric switching device 16, 17.

The first voltage drop $V_{switch1}$ includes the voltage drop over the shunt resistor 13. However, since the resistivity of the shunt resistor is small, the additional voltage drop is small, too. The additional voltage drop may be taken into account, when first voltage drop $V_{switch1}$ is evaluated, i.e. by comparing the first voltage drop $V_{switch1}$ with a predefined threshold.

When an AC voltage is applied to the feed node 8, the voltage drops $V_{switch1}$, $V_{switch2}$ over the first and second electric switching devices 16, 17 will pulsate, when the electric switching devices 16, 17 are switched off. The voltage drop $V_{switch1}$, $V_{switch2}$ over each of the first and second electric switching devices 16, 17 will be constantly low, when the respective electric switching device 16, 17 is switched on.

In a state, in which the first and second electric switching devices 16, 17 are turned off, the body diodes of the first and second electric switching devices 16, 17 may become conductive and cause an erroneous detection of a false on state. Thus, for reliably determining the off state, it is important to measure $V_{switch1}$ only when a positive voltage is applied to node 8. The second electric device 17 may be in an undetermined state. Similarly, $V_{switch2}$ shall be measured only when a positive voltage is applied to node 12. In this case, the second electric switching device 16 may be in an undetermined state.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft solid state power controller comprising:
   a feed node configured to be electrically connected to a primary electric power supply;
   a load node configured to be electrically connected to at least one electric load;
   at least one electric switching device coupled between the feed node and the load node, wherein the at least one electric switching device is switchable between (i) an on-state in which the at least one electric switching device provides an electric connection between the feed node and the load node and (ii) an off-state in which the at least one electric switching device electrically isolates the load node from the feed node; and
   a secondary electric power supply independent from the primary electric power supply and galvanically isolated from the primary electric power supply, the secondary electric power supply configured to apply a test voltage between the feed node and the load node in order to allow a determination of a switching state of the at least one electric switching device based on a voltage drop between the feed node and the load node.

2. The aircraft solid state power controller according to claim 1, wherein the at least one electric switching device is a solid state switching device.

3. The aircraft solid state power controller according to claim 1, wherein the secondary electric power supply is galvanically isolated from other power supplies of the aircraft solid state power controller.

4. The aircraft solid state power controller according to claim 1, further comprising an integrated circuit having an isolated direct current (DC) power supply, the integrated circuit configured to provide the secondary electric power supply, wherein the integrated circuit is a DC/DC power chip.

5. The aircraft solid state power controller according to claim 4, wherein the DC/DC power chip is an ADUM 5241 chip or an ADUM 5242 chip.

6. The aircraft solid state power controller according to claim 1, wherein:
   the at least one electric switching device has a control terminal configured to receive a control voltage for switching the at least one electric switching device at least between the on-state and the off-state; and
   the aircraft solid state power controller further comprises an electric switching device controller configured to selectively apply the control voltage to the control terminal of the at least one electric switching device for switching the at least one electric switching device at least between the on-state and the off-state.

7. The aircraft solid state power controller according to claim 6, wherein the secondary electric power supply is configured to supply electric power to the electric switching device controller for supplying the control voltage to the control terminal of the at least one electric switching device.

8. The aircraft solid state power controller according to claim 1, wherein:
   the at least one electric switching device comprises a first terminal connected to the feed node and a second terminal connected to the load node; and
   the test voltage that is output by the secondary electric power supply is referenced to the second terminal of the at least one electric switching device or to a reference point between the second terminal and the load node.

9. The aircraft solid state power controller according to claim 1, further comprising a test voltage sensor configured to detect the voltage drop between the feed node and the load node.

10. The aircraft solid state power controller according to claim 9, wherein the test voltage sensor is configured to deliver a signal indicative of whether the at least one electric switching device is in its on-state or in its off-state.

11. The aircraft solid state power controller according to claim 10, wherein the test voltage sensor is configured to deliver a binary output signal.

12. The aircraft solid state power controller according to claim 10, further comprising a comparator, the comparator having a first input configured to receive the signal delivered by the test voltage sensor, compare the received signal with a reference voltage, and provide a binary output signal.

13. The aircraft solid state power controller according to claim 12, wherein the comparator comprises a second input configured to receive the reference voltage or a signal corresponding to the reference voltage.

14. An aircraft electric power supply system comprising:
at least one aircraft electric power supply;
at least one electric load; and
at least one aircraft solid state power controller according to claim 1, wherein the at least one aircraft solid state power controller is configured to control a supply of electric power from the at least one aircraft electric power supply to the at least one electric load.

15. An aircraft comprising:
at least one aircraft solid state power controller according to claim 1.

16. The aircraft solid state power controller according to claim 1, further comprising a test voltage sensor configured to:
detect the voltage drop between the feed node and the load node based on a voltage drop across a test resistor coupled between the load node and a ground of the secondary electric power supply; and
deliver a signal indicative of whether the at least one electric switching device is in its on-state or in its off-state based on the voltage drop across the test resistor.

17. The aircraft solid state power controller according to claim 16, wherein the test resistor has a resistivity between 100 Ω and 680 kΩ.

18. A method of operating an aircraft solid state power controller, the aircraft solid state power controller comprising a feed node configured to be electrically connected to a primary electric power supply, a load node configured to be electrically connected to at least one electric load, and at least one electric switching device coupled between the feed node and the load node, the method comprising:

selectively switching the at least one electric switching device between (i) an on-state in which the at least one electric switching device provides an electric connection between the feed node and the load node and the primary electric power supply is connected to the electric load and (ii) an off-state in which the at least one electric switching device electrically isolates the load node from the feed node;
applying a test voltage between the feed node and the load node, wherein the test voltage is provided by a secondary electric power supply independent from the primary electric power supply and galvanically isolated from the primary electric power supply; and
determining a switching state of the at least one electric switching device by detecting a voltage drop between the feed node and the load node.

19. The method according to claim 18, further comprising delivering a signal indicative of whether the at least one electric switching device is in its on-state or in its off-state based on the detected voltage drop between the feed node and the load node.

20. The method according to claim 18, wherein determining the switching state of the at least one electric switching device comprises:
detecting a voltage drop across a test resistor coupled between the load node and a ground of the secondary electric power supply; and
detecting the voltage drop between the feed node and the load node based on the voltage drop across the test resistor.

* * * * *